United States Patent

[11] 3,564,968

| [72] | Inventor | David W. Daniel<br>Birmingham, Mich. |
| --- | --- | --- |
| [21] | Appl. No. | 795,494 |
| [22] | Filed | Jan. 31, 1969<br>Division of Ser. No. 570,967, Aug. 8, 1967,<br>Patent No. 3,451,111. |
| [45] | Patented | Feb. 23, 1971 |
| [73] | Assignee | Lear Siegler, Inc.<br>Santa Monica, Calif. |

[54] METHOD OF SHAVING GEARS
5 Claims, 5 Drawing Figs.

| [52] | U.S. Cl. | 90/1.6 |
| --- | --- | --- |
| [51] | Int. Cl. | B23f 19/06 |
| [50] | Field of Search | 90/1.6,<br>1.65; 29/103 |

[56] References Cited
UNITED STATES PATENTS

| 2,317,161 | 4/1943 | Witham | 90/1.6 |
| 3,213,754 | 10/1965 | Hurth et al | 90/1.6 |
| 3,293,987 | 12/1966 | Daniel | 90/1.6 |

*Primary Examiner*—Gil Weidenfeld
*Attorney*—Whittemore, Hulbert & Belknap

ABSTRACT: Method of shaving gears with a gear-like cutter having teeth gashed parallel to the plane of rotation with the gashes having sidewalls intersecting the flanks to provide substantially equal obtuse included angle cutting edges at opposite sides of each gash, rotating the cutter and gear in mesh at crossed axes in a single direction of rotation, and providing a relative depth feed between the gear and cutter parallel to a line perpendicular to the axes of the gear and cutter while preventing relative lateral movement therebetween, in which the profile at the coast side of the cutter teeth is lower than at the drive side thereof.

PATENTED FEB 23 1971
3,564,968
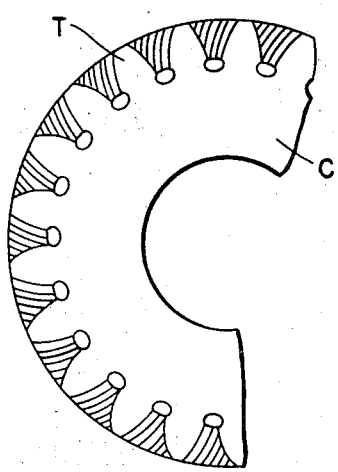
FIG.1
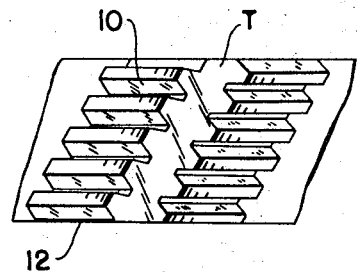
FIG.2
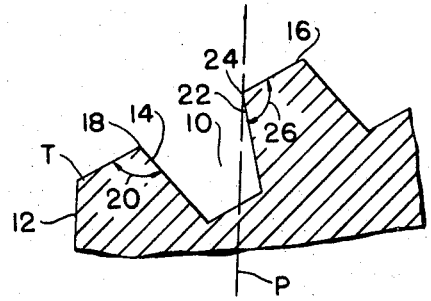
FIG.3
FIG.4 FIG.5
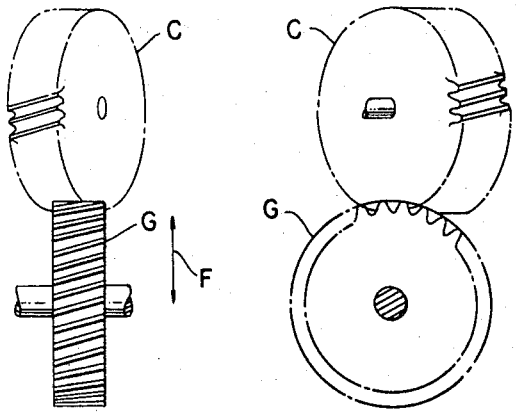
INVENTOR.
DAVID W. DANIEL
BY Whittemore,
Hulbert & Belknap
ATTORNEYS

METHOD OF SHAVING GEARS

CROSS REFERENCE TO RELATED APPLICATION

The present application is a division of my prior copending application Ser. No. 570,967, filed Aug. 8, 1966, now U.S. Pat. No. 3,451,111.

BRIEF SUMMARY OF THE INVENTION

In the present invention a gear shaving operation is carried out employing a cutting tool in the form of a gear having serrations extending across the sides of the teeth of the cutter in a direction parallel to the plane of rotation. The serrations or gashes have sidewalls which intersect the said surfaces of the gear teeth in equal obtuse angles. The operation is carried out while rotating the gear and cutter in tight mesh in a single direction and by providing a relative depth feed in a direction parallel to a line intersecting the axes of the gear and cutter at right angles while preventing relative lateral movement.

In order to provide profiles on the teeth of the shaved gear, the teeth of the gearlike tool are provided with different modifications at opposite sides thereof. Specifically, the profiles of the cutter teeth, in order to produce generally involute profiles on the teeth of the gear, have lower or minus profiles at the coast side of the teeth than at the driver-driven side thereof.

It is an object of the present invention to provide a gear shaving cutter so modified as to permit the shaving of a succession of identical gears in operations in which the gear and cutter are rotated together in tight mesh in a single invariable direction of rotation, and in which the feed to provide stock removal is in a direction parallel to a line radial to the axes of both the gear and cutter, and in which all relative traverse movements between the gear and cutter transverse to the line perpendicular to their axes are prevented.

It is a further object of the present invention to provide a method of plunge cutting characterized in the use of a special cutter having opposite sides of its teeth modified with particular reference to corresponding sides of the teeth of the gear in which the direction of rotation is invariable in the same direction.

Other objects and features of the invention will become apparent as the description proceeds, especially when taken in conjunction with the accompanying drawing.

BRIEF DESCRIPTION OF THE DRAWING

FIG. 1 is a fragmentary side view of a gear shaving cutter constructed in accordance with the present invention.

FIG. 2 is an enlarged fragmentary top view of the a tooth of the cutter shown in FIG. 1.

FIG. 3 is a further enlarged transverse section through a gash, channel, or serration provided in the flanks of the teeth of the cutter to produce cutting edges therein.

FIG. 4 is an elevational view of the cutter in mesh with a work gear.

FIG. 5 is a side elevational view of the gear and cutter as seen in FIG. 4.

DETAILED DESCRIPTION OF THE INVENTION

In accordance with the present invention the teeth of a work gear are machined by a gear shaving operation which results from rolling the gear and a gearlike serrated cutter in tight mesh at crossed axes in a single invariable direction of rotation while effecting a plunge feed in a direction parallel to the line perpendicular to the axes of both gear and cutter, while preventing traverse movement between the gear and cutter in a direction transverse to such line.

In order to carry out this operation efficiently it is essential that equal or substantially equal removal of stock takes place at both sides of the teeth of the gear. It has been found that this result is accomplished if the teeth of the cutter are gashed in a particular way so as to provide a multiplicity of cutting edges which extend generally in planes parallel to the plane of rotation of the cutter, the sidewalls of the gashes being effective to define with the flanks of the teeth included angles which are substantially equal and which are at least 90° and preferably between 100 and 110°. Employing a cutter with these substantially equal, preferably obtuse, angle cutting edges it has been found that substantially equal cutting action occurs at both sides of the teeth of the gear during unidirectional rotation. It has further been discovered however, that the profiles of the teeth of the gear, produced with the profiles of the teeth of the cutter are identical or are theoretically conjugate to the desired profiles on the gear teeth, do not produce the desired involutes. It has been found that the profile at the driver-driven side of the gear teeth is relatively lower than the profile at the coast side thereof.

The terms "high" and "low" profile refers to results noted when the profiles are checked on accurate measuring instruments. Normally, the profiles of gear teeth are substantially involute although in modern gear practice these involutes are often deliberately modified for improved operation. In an instrument for measuring involute curvature the usual recording of the check results in a straight vertical line if the involute is a true involute from the bottom to top. The curve is said to be higher or is said to be a plus involute if additional material is present adjacent the crest of the tooth. Conversely, the curve is said to be low or to be a minus involute if material has been removed adjacent the crest of the teeth so that the chart shows a fall-off. It will be understood that in charting involute curves the curve is normally plotted to begin on a reference line at the bottom of the teeth or adjacent the start of active profile.

It is possible to correct for this deviation between the driven and coast sides of the gear produced by a cutter having teeth whose profiles are identical at opposite sides by appropriate modification of the teeth of the cutter. This however, precludes reversing the direction of rotation between the gear and cutter because the modification provided to correct for the profile deviation between the drive and coast sides will result in an error of twice the magnitude developed by an unmodified cutter, upon reversal in rotation. Accordingly, with a particular setup the rotation will be in a single invariable direction, which means that all of the cutting will be performed by cutting edges facing in a particular direction. This cutting action in plunge shaving is the result of crossed axis slide or relative sliding movement longitudinally of the teeth from end to end thereof due to the fact that the gear and cutter are rolling in planes which are oblique to each other and hence, only those cutting edges facing the direction of movement of the gear are effective.

Referring to the drawing, in FIG. 1 there is shown a portion of a cutter C having teeth T provided with a multiplicity of cutting edges as indicated in the FIGURE.

FIG. 2 is an enlarged plan view of a single tooth T and it will be observed that the flanks of the teeth are gashed to provide grooves or serrations 10, the sides of which intersect the flanks of the teeth to provide cutting edges. From this FIG. it will be noted that the gashes or grooves 10 extend in planes parallel to the side surface 12 of the cutter, or in other words, they extend in the plane of rotation.

Referring now to FIG. 3, there is shown a further enlargement, the FIG. being a sectional view through one of the grooves or gashes 10. In this FIG. it will be observed that one sidewall 14 of the gash 10 intersects the tooth flank surface 16 in a sharp edge 18 forming a cutting edge. The cutting edge has an included angle between the surfaces 14 and 16 as shown at 20, which it will be observed is an obtuse included angle slightly greater than 90°. Similarly, the opposite sidewall 22 of the gash 10 intersects the flank 16 to form a cutting edge 24 having an included angle as indicated at 26. In accordance with the present invention the included angles 20 and 26 are of the cutting edges 18 and 24 are substantially equal and are at least 90°. Preferably, the included angles 20 and 26 are between 100 and 110° and excellent results are obtained when these angles are substantially 105°. It will be observed that the surface 22 of the gash is undercut with respect to the plane of rotation indicated at P, this plane of course being parallel to a side surface 12 of the cutter.

When the cutter C is meshed at crossed axes with a gear G, as noted for example in FIG. 4, and the parts are rotated in mesh by applying rotating force directly to the cutter C, the teeth of the cutter C drive the gear in rotation and the leading flank of each tooth T of the cutter C becomes the driving side and the flank of the gear teeth engaged thereby becomes the driven side. The remaining flanks of the teeth of the gear and cutter are of course the coast sides. In the gear finishing operation the cutter C is directly rotated and the gear G is driven in rotation due to its meshed relationship to the cutter C.

The present invention is concerned particularly with plunge shaving in which a relative depth feed is accomplished by relative movement between the gear and cutter in the direction of the arrow F, the infeeding direction of course being the direction which reduces the center distance between the gear and cutter. All lateral traverse between the gear and cutter in a direction transverse to the direction of feed is prevented.

Gears finished by rotating the cutter C in a single direction are found to exhibit a deviation from conjugate tooth form and specifically, this deviation as observed on accurate checking instruments is a lower profile or minus involute at the driven side of the gear teeth, as compared to that at the coast side. There is a corresponding high curvature or plus involute at the coast side of the gear teeth. Accordingly, in order to produce teeth having the desired profiles on the gear, it is necessary to modify the teeth on the cutter so that the side constituting the drive side of the cutter teeth are made of higher curvature or plus involute relative to the opposite side of the cutter teeth. Conversely, the opposite or coast side of the teeth of the cutter are modified as to profile to have a low curvature or minus involute as compared to the driver-driven side.

It is to be noted that the involute modification is not necessarily equal and opposite at opposite sides of the cutter teeth from a profile theoretically conjugate to the profiles desired to be shaved on both sides of the gear teeth.

This different modification of the opposite sides of the teeth of the cutter precludes a gear finishing operation in which, for example, alternate gears are finished with rotation in opposite directions, as has previously been suggested. In other words, with the modification of cutter teeth found necessary to produce the desired curvature on the gear teeth, all of the gear teeth must be finished with a particular setup while rotation is in a single invariable direction.

Since only those cutting edges facing a single direction are operative, the included angle of the noncutting is of course immaterial. However, it is usual to make all cutting edges of the same preferably obtuse included angle.

In a simple case, where it is desired to produce teeth on the gear having unmodified involutes at both sides of the teeth, the foregoing cutter modification may result in the provision of a higher curvature or plus involute at one side of the teeth of the cutter and the formation of a low curvature or minus involute at the opposite side of the cutter teeth. Alternatively, the relative difference in involute may result from raising the involute at one side of the teeth, lowering the involute of the other side, or both.

However, in modern gear production it is unusual to specify unmodified involutes for the teeth of a gear and accordingly, the more general rule is that the profile on the drive side of the teeth of the cutter are modified relative to the coast side thereof by providing a relatively higher involute or curvature. Conversely, the coast side profiles of the teeth and cutter are modified relative to the drive side by providing a lower curvature.

The amount of profile correction applied to the teeth of the cutter to correct for the variation between the drive side and coast side of the gear teeth is relatively small, as for example between .0001 and .0010 inch. While this is a very small correction, modern gear production holds tolerances within such limits and deviations of only a few ten-thousandths of an inch, particularly where these deviations appear consistently at opposite sides of gear teeth, would render the gear unacceptable.

As disclosed in the foregoing, the present invention relates to a particular method of gear production which in turn depends upon the use of a particularly modified cutter; namely, a cutter modified to provide substantially equal cutting at opposite sides thereof. When this method is carried out however without further modification of the cutter, it results in profile variations between the driven and coast side of the gear teeth which are unacceptable in accordance with modern standards. Therefore, the present invention involves a method which requires the use of a particular cutter and the single inventive concept may be expressed either in terms of a specially modified cutter for a particular use, or the method of using the particularly modified cutter.

I claim:

1. The method of shaving a series of cylindrical involute gears which comprising meshing the gears sequentially at crossed axes and in tight mesh with a cylindrical involute gear shaving cutter of gear form having gashes at opposite sides of its teeth parallel to the plane of rotation and having sidewalls shaped to intersect the flanks of the teeth to provide cutting edges having substantially equal obtuse included angles and having tooth profiles of generally involute form and generally conjugate to the tooth profiles desired on the teeth of the gears, driving the gear or cutter in a single invariable direction of rotation to establish a driving-driven side and a coast side to the teeth of the gear and cutter, providing a plunge feed between the gear and cutter in a direction radial of the axes of both while preventing lateral traverse therebetween, and providing on the driver-driven side of the cutter teeth a profile which is plus involute as compared to the profile at the coast side of the teeth of the cutter.

2. The method of claim 1 in which the teeth of said cutter are helical.

3. The method of claim 1 in which the amount by which the profiles of the cutter teeth differ from the desired profiles on the mating gear teeth is between .0001 and .0010 inches.

4. The method of claim 2 in which the amount by which the profiles of the cutter teeth differ from the desired profiles on the mating gear teeth is between .0001 and .0010 inches.

5. The method of claim 1 which comprises driving the cutter directly, and in which the plus involute modification is provided at the driving side of the cutter teeth.